(12) United States Patent
Martindale

(10) Patent No.: US 9,828,108 B2
(45) Date of Patent: Nov. 28, 2017

(54) AUTOMATED FLIGHT THROTTLE CONTROL

(71) Applicant: THE BOEING COMPANY, Chicago, IL (US)

(72) Inventor: Ian Carey Martindale, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/066,929

(22) Filed: Mar. 10, 2016

(65) Prior Publication Data

US 2017/0259931 A1    Sep. 14, 2017

(51) Int. Cl.
*B64D 31/06*    (2006.01)
*B64D 43/02*    (2006.01)

(52) U.S. Cl.
CPC ............. *B64D 31/06* (2013.01); *B64D 43/02* (2013.01)

(58) Field of Classification Search
CPC ................................ B64D 31/06; B64D 43/02
USPC .......................................................... 701/14
See application file for complete search history.

(56) References Cited

U.S. PATENT DOCUMENTS

| | | | |
|---|---|---|---|
| 8,195,346 B1 | 6/2012 | Duerksen et al. | |
| 8,965,601 B1* | 2/2015 | Barber | G01C 23/005 340/974 |
| 2003/0093187 A1* | 5/2003 | Walker | B64C 13/20 701/1 |
| 2005/0151672 A1 | 7/2005 | Augustin et al. | |
| 2009/0326745 A1* | 12/2009 | Ramos | B64D 31/08 701/14 |

FOREIGN PATENT DOCUMENTS

WO    0189926    11/2001

OTHER PUBLICATIONS

European Patent Office, "European Search Report", in connection with European Patent Application No. 17160427.5, dated Sep. 25, 2017, 7 pages.

* cited by examiner

*Primary Examiner* — Yazan Soofi
(74) *Attorney, Agent, or Firm* — Hanley, Flight & Zimmerman, LLC

(57) ABSTRACT

Automated throttle control is described herein. One disclosed example method includes calculating, using a processor, a thrust resolver angle based on a flight condition of an aircraft, and controlling a throttle from moving past at least one of the thrust resolver angle or a range defined by the thrust resolver angle to maintain the aircraft in a preferred flight mode.

20 Claims, 9 Drawing Sheets

AUTOMATED FLIGHT THROTTLE CONTROL

FIELD OF THE DISCLOSURE

This patent relates generally to aircraft and, more particularly, to automated flight throttle control.

BACKGROUND

Some known autothrottle systems are used to control/maintain an amount of thrust provided by an aircraft during maneuvers and/or cruise. Typically, an autothrottle system can be placed into a hold mode, in which the autothrottle is no longer controlling the amount of thrust provided by the aircraft. Known autothrottle systems do not automatically change to a different mode after the autothrottle system has been placed into the hold mode unless commanded by the pilot.

SUMMARY

An example method includes calculating, using a processor, a thrust resolver angle based on a flight condition of an aircraft, and controlling a throttle from moving past at least one of the thrust resolver angle or a range defined by the thrust resolver angle to maintain the aircraft in a preferred flight mode.

Another example method includes analyzing, using a processor, a received flight input and at least one flight condition to determine whether the flight input will place the aircraft in a state different from a preferred flight state. The example method also includes, upon determining that the flight input will not place the aircraft in the state different from the preferred flight state, enabling an autothrottle control to be placed into a hold mode.

An example tangible machine readable medium has instructions stored thereon, which when executed, cause a processor to determine that a flight input of an aircraft will cause the aircraft to be in a non-preferred flight condition, and based on the determination, change an autothrottle mode of the aircraft to maintain the aircraft in a preferred flight condition.

An example apparatus includes a sensor of an aircraft to determine a flight condition of the aircraft, a processor to calculate at least one of a throttle limit or a throttle range to maintain the aircraft in a preferred flight condition, and an electromechanical mechanism to control a throttle lever from moving beyond the at least one of the throttle limit or the throttle range to maintain the aircraft in the preferred flight condition.

Figure 1:
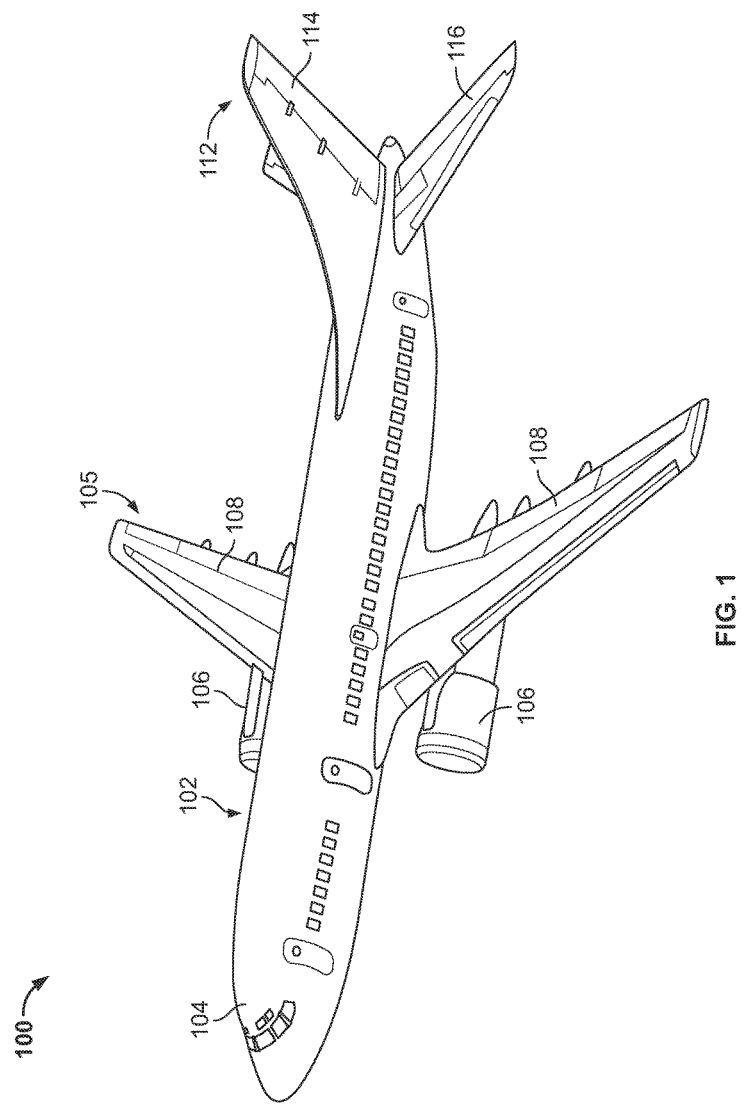
FIG. 1 is an example aircraft in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Automated flight throttle control is disclosed herein. Some known autothrottle systems of aircraft are used to control/maintain an amount of thrust provided by the aircraft during maneuvers and/or cruise, for example. These known autothrottle systems allow an aircraft to be placed into a hold mode in which the autothrottle system is overridden and/or suspended based on a flight input from a pilot. As a result, the pilot may be able to place a throttle setting of the aircraft into a non-preferred condition and/or place the aircraft in a lower performance mode. In known typical systems, once placed into the hold mode, the autothrottle system does not automatically change modes without being commanded to do so by the pilot.

The examples disclosed herein prevent aircraft from entering the non-preferred flight condition regardless of whether an autothrottle hold mode has been initiated/enabled. The examples disclosed herein control and/or set the throttle range and/or throttle setting(s) of an aircraft based on flight conditions of the aircraft and/or a flight input received (e.g., a flight input command, a cockpit command, etc.). In some examples, the flight conditions are used to calculate a thrust resolver angle (e.g., a thrust resolver limit) that restricts (e.g., inhibits motion) and/or limits a throttle (e.g., a throttle control). For example, a throttle control (e.g., an automated throttle control) may be restricted from moving past the defined thrust resolver angle (TRA) and/or a range defined by the thrust resolver angle. In some examples, an electromechanical control system may prevent physical movement of the throttle and/or a throttle lever (e.g., a throttle stick) beyond the calculated thrust resolver angle, for example. For example, an actuator and/or solenoid may be used to control (e.g., prevent from moving past) a pivot of the throttle and/or the throttle lever from moving beyond an angle and/or an angular range defined by the calculated thrust resolver angle.

In other examples, a flight input for the aircraft is compared/analyzed relative to a calculated thrust resolver angle, which is determined based on flight condition(s), and the flight input may not be initiated based on the calculated thrust resolver angle. In particular, the flight input may be compared to a preferred thrust/velocity setting that is calculated based on the flight condition(s) to determine whether to execute the flight input and/or enable a throttle override/hold mode.

In other examples, the aircraft is returned to another autothrottle mode from a hold mode when a flight condition of the aircraft corresponds to a non-preferred flight condition of the aircraft. For example, an autothrottle mode may be automatically changed when a velocity of the aircraft moving below a defined range and/or a thrust setting is set below a calculated allowable and/or preferred thrust resolver angle.

As used herein, the terms "flight input command" or "flight input" may refer to a manual command issued at a cockpit or a command to enter an automated flight mode (e.g., a selected automated mode, an autopilot, a flight level change ("FLCH") mode, a take-off and go around ("TOGA") command, a vertical navigation ("VNAV," "VNAV IDLE," "VNAV HOLD") command, etc.). In other words, the terms "flight input" or "flight input command" may refer to manual control or an initiation of an automated flight mode, for example. As used herein, the term "flight condition" may encompass, but is not limited to, air speed, altitude, terrain topography, wind speed, air conditions (e.g., turbulence), attitude, yaw, pitch, roll and/or weather, etc.

FIG. 1 illustrates an example aircraft 100 in which the examples disclosed herein may be implemented. The aircraft 100 of the illustrated example includes a fuselage 102 with a cockpit 104, wings 105 with engines 106 and control surfaces (e.g., flaps, ailerons, tabs, etc.) 108, which are located at a trailing edge of the wings 105 and may be displaced or adjusted (e.g., angled, etc.) to provide lift during takeoff, for example. The example aircraft 100 also includes stabilizers 112 with rudders 114 and elevators 116. In some examples, throttles of the respective engines 106 are controlled to vary and/or control a velocity of the aircraft 100. In this example, the resultant thrust of the engines 106 along with movement of the control surfaces 108, the rudder 114 and/or the elevators 116 are used to control/direct the aircraft 100 during a maneuver such as a controlled descent (e.g., a controlled and/or rate controlled increase/decrease in altitude) and/or execution of an automated flight program such as a TOGA program, or a VNAV program, etc.

Figures 2A, 2B:
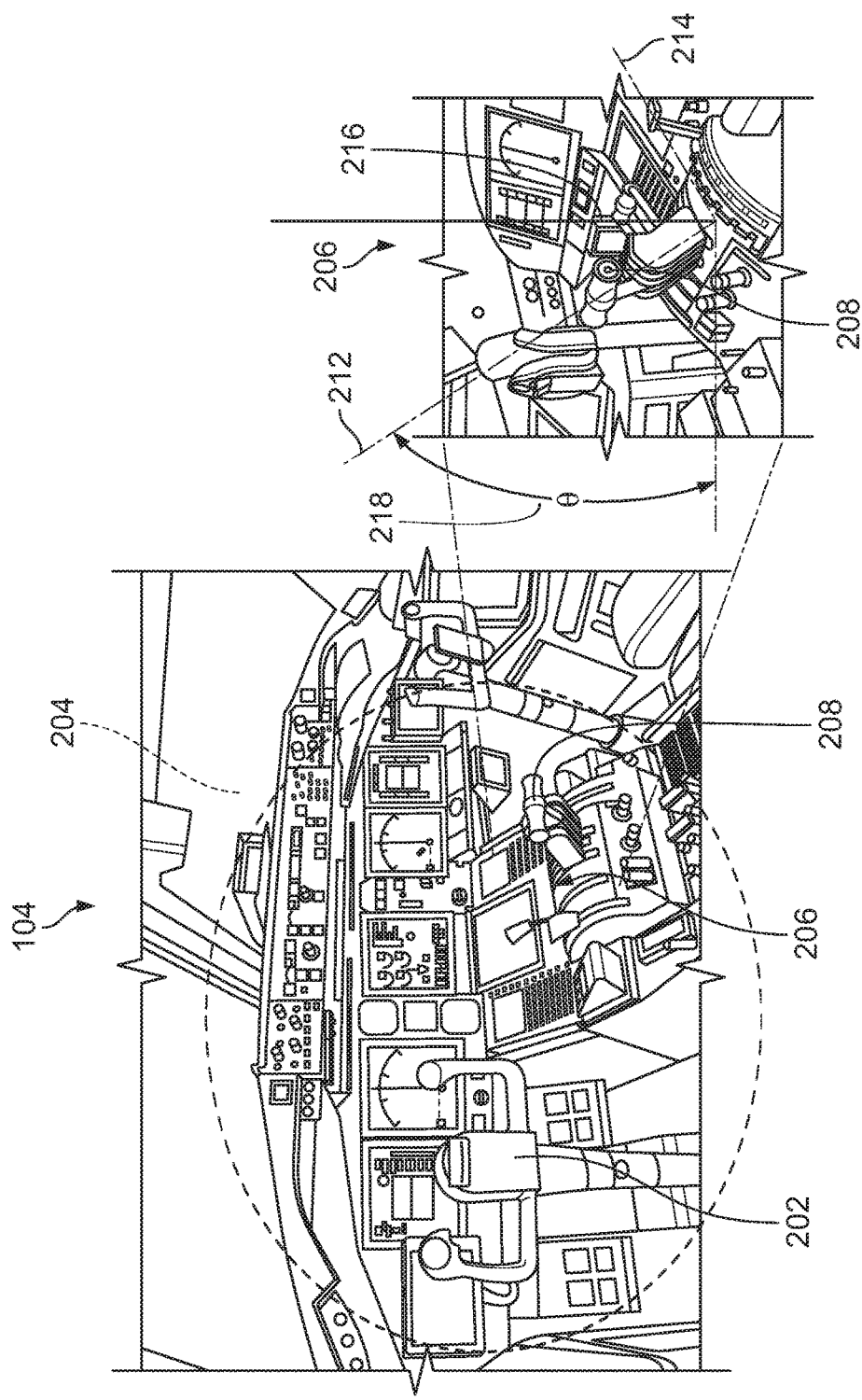
FIG. 2A is an internal view of an example cockpit of FIG. 1.
FIG. 2B is a detailed view of an example throttle control of the example cockpit of FIGS. 1 and 2.

FIG. 2A is an internal view of the example cockpit 104 of FIG. 1. As can be seen in the illustrated example of FIG. 2A, the cockpit 104 includes a flight stick 202, an instrumentation panel 204 and a throttle control 206, which includes a throttle lever (e.g., a throttle stick) 208. In operation, a pilot in the cockpit 104 may read and/or obtain flight data and/or flight condition data of the aircraft 100 from the instrumentation panel 204. Based on this data, one or more controls of the aircraft 100 may be utilized by the pilot to direct the aircraft 100 during flight. In this example, thrust of the aircraft 100 is controlled by the throttle lever 208, the throttle control 206, in general, and/or controls within the cockpit 104 related to autothrottle settings (e.g., controls in the instrumentation panel 204, etc.).

FIG. 2B is a detailed view of an example throttle control 206 of the example cockpit 104 of FIGS. 1 and 2A. In the illustrated example of FIG. 2B, the throttle lever 208 may be pushed and/or pivoted toward or away from the front of the aircraft 100 to vary an amount of thrust output from the engines 106. For example, a pilot may push the throttle lever 208 forward toward the front/fore of the aircraft 100 to increase a thrust of the engines 106. Similarly, the pilot may pull back and/or pivot the throttle lever 208 back toward the rear/aft of the aircraft 100 to reduce thrust output and/or throttle of the engines 106.

As a result of being able to move the throttle lever 208 forward and backward to vary a thrust output of the engines 106, the throttle lever 208 of the illustrated example has an aft limit (e.g., a lower limit throttle setting) 212 and a fore limit (e.g., an upper limit throttle setting) 214. In this example, the aft limit 212 and the fore limit 214 define extreme ranges of the movement of the throttle lever 208, which are not varied and/or redefined during flight in this example. In some examples, however, a physical and/or electromagnetic device may be used to limit the range of movement of the throttle lever 208. Additionally or alternatively, ranges of the throttle lever 208 may be altered (e.g., values of fore and aft limits redefined and/or varied to accommodate changes in allowable range) instead of physically limiting a movement range of the throttle lever 208 (e.g., in a fly-by-wire control system).

In some examples and as described in greater detail below in connection with FIG. 3, the aft limit 212 and/or the fore limit 214 may be varied and/or redefined (e.g., during flight and/or across different flight conditions) to vary a permitted range of an angle 218, which is denoted by the symbol, θ, at which the throttle lever 208 is positioned to define an amount of thrust provided by the engines 106. In the examples set forth herein, current (e.g., instantaneous) and/or controlled throttle angles and/or set point values refer to the angle 218. In particular, the aft limit 212 of the illustrated example corresponds to a value of about 31 degrees relative to horizontal and the fore limit 214 corresponds to a value of about 70 degrees relative to horizontal, thereby defining a maximum angular range (e.g., an angular displacement range) of approximately 39 degrees for the throttle lever 208. However, any appropriate angle limits and/or range(s) may be used instead.

Figure 3:
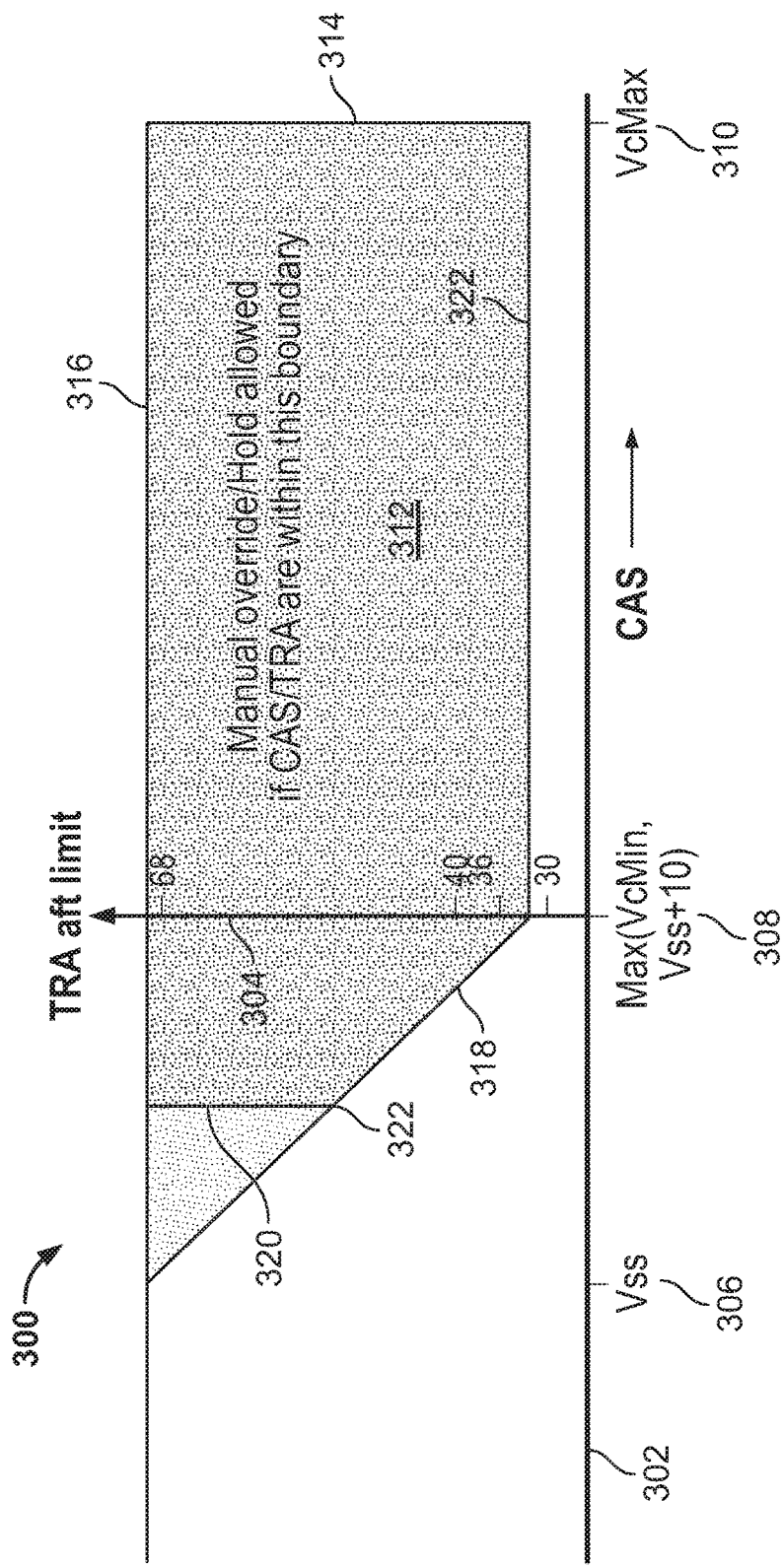
FIG. 3 illustrates an example throttle control plot in accordance with the teachings of this disclosure.

FIG. 3 illustrates an example throttle control plot 300 in accordance with the teachings of this disclosure. The example throttle control plot 300 relates velocity/speed and thrust ranges, and includes a horizontal axis 302, which represents a calibrated air speed ("CAS") and/or velocity of the aircraft 100. The example control plot 300 also includes a vertical axis 304, which represents a throttle angle (e.g., a thrust resolver angle, the angle 218) of the aircraft 100. In this example, the throttle angle is represented as degrees. In particular, in this example, the throttle angle is approximately 30 degrees (e.g., the aft limit 212 at about 31 degrees). As can be seen in the illustrated example of FIG. 3, the horizontal axis 302 includes a stick shaker velocity 306, which is denoted by $V_{ss}$ and indicates a velocity limit at which a yoke stick such as the flight stick 202 may be shaken or vibrated to alert a pilot. In particular, a vibration device communicatively coupled to the yoke stick may vibrate when a speed is below a threshold, which is equivalent to the stick shake velocity 306, for example. In this example, a transition velocity 308 is defined by taking the maximum of a minimum speed (e.g., a minimum speed allowed by an automated flight control system), which is denoted by $V_{cMin}$, or an incremental sum, which is denoted by $V_{ss+10}$, of the shake speed velocity 306, $V_{ss}$, and an increment, which is 10 knots in this example. However, any appropriate incremental value may be used based on aircraft design, air conditions, aircraft maneuverability, etc. In this example, a maximum velocity 310 of the aircraft 100 is denoted by $V_{cMax}$.

In this example, a boundary (e.g., an envelope, a polygonal area, etc.) defines a region 312 of the control plot 300 in which manual overrides (e.g., initiation of a hold command) of an autothrottle system are enabled. In other words, in the illustrated example, a pilot may override an autothrottle system and place the autothrottle system into a hold mode within the region 312. Additionally or alternatively, the region 312 may define an allowable/enabled throttle range (e.g., continuously re-defining the aft limit 212 and/or the fore limit 214 based on a flight condition and/or an updated flight condition). In other words, the region 312 may also be used to limit a permitted throttle range (e.g., an allowed/permitted throttle range) based on velocity of the aircraft 100.

To define the region 312, the region 312 includes a first boundary or edge 314, which is defined by the velocity (e.g., $V_{cMax}$) 310, and a second boundary or edge 316 that is defined by the throttle fore limit 214. To define a function of throttle variation near calibrated air speeds close to the stick shaker speed velocity 306, a sloping line 318 defines a third boundary or edge representing a portion of the region 312 where the manual override of the autothrottle may not be enabled. Additionally or alternatively, the sloping line 318 defines throttle limits in which the throttle may be controlled and/or prevented from moving as received in a flight input command (e.g., a manual command or a command initiating an automated program such as TOGA). Determination of a slope of the line 318 is discussed in greater detail below in connection with FIG. 4.

Alternatively, in some examples, a portion and/or outer limit of the region 312 is defined by a fourth boundary or edge 320. In such examples, once the calibrated air speed has reached a value below a transition point 322, the automated/controlled thrust limit is prevented from moving below the fore limit (e.g., the fore limit 214) and/or, in some examples, a pilot is prevented from entering a hold mode that places the thrust setting below the fore limit. In other words, in these examples, once a speed of the aircraft 100 is below a threshold corresponding to the transition point 322, the thrust resolver angle is not enabled/permitted to be below the thrust fore limit in a controlled mode or, alternatively, in a manual mode.

In some examples, the region 312 is continuously defined/updated based on changing flight condition(s). While the region 312 has an example shape shown in FIG. 3, any appropriate shape may be used.

Figure 4:
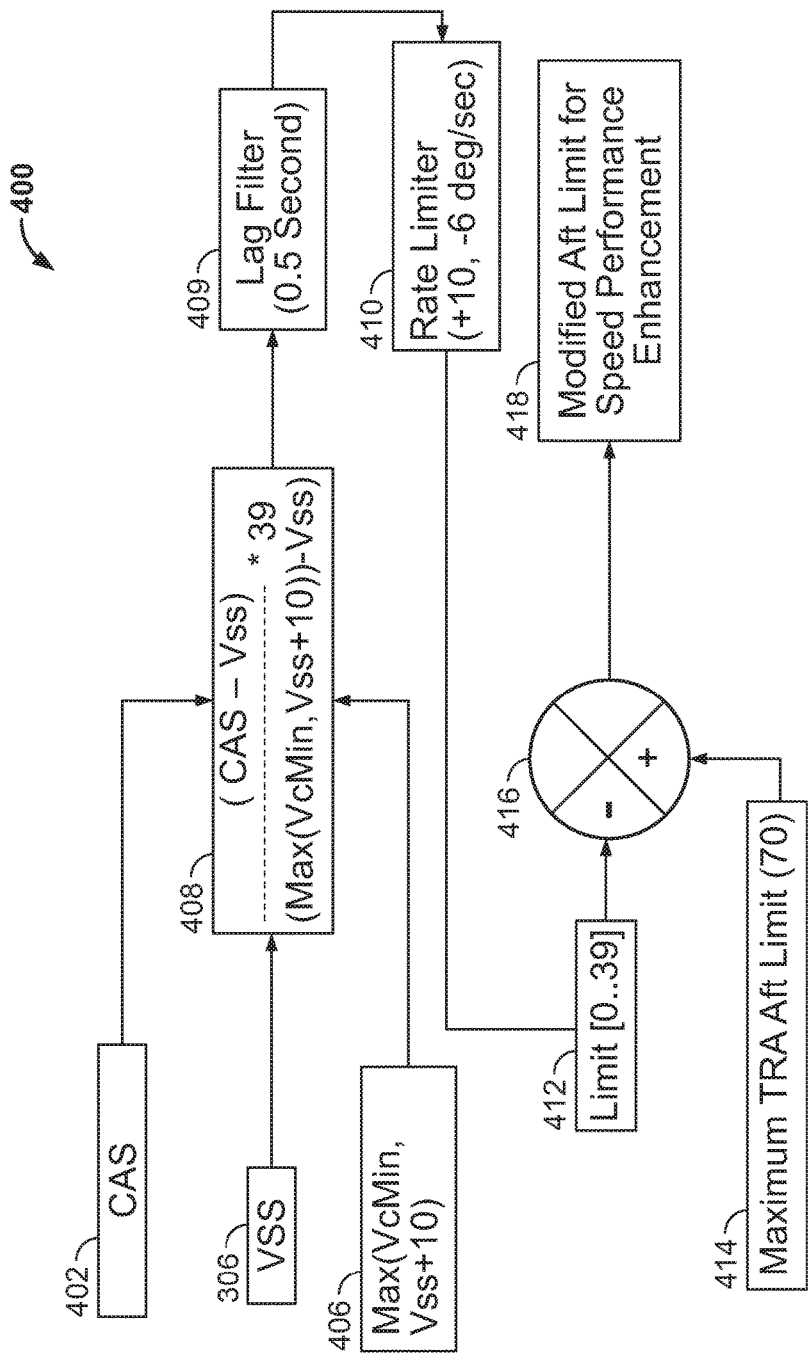
FIG. 4 is a schematic overview of an example algorithm to implement the examples disclosed herein.

FIG. 4 is a schematic overview of an example algorithm 400 to implement the examples disclosed herein. In the illustrated example of FIG. 4, a calibrated air speed 402, which is denoted by CAS, as well as the stick shaker velocity 306, which is denoted by $V_{ss}$, are provided as inputs to a function 408. In some examples, a low end speed value 406, which is also provided to the function 408, is calculated as a maximum of ($V_{CMIN}$, $V_{ss+10}$), where $V_{CMIN}$ is a minimum control speed of the aircraft, and where $V_{ss}$ is the aforementioned stick shaker velocity 306 and $V_{ss+10}$ is the incremental stick shaker speed equivalent to the velocity 306 plus an added nominal speed, which is 10 knots in this example. However, any other appropriate additive nominal speed may be used based on aircraft design, flight conditions, flight mode, etc. In this example, the function 408 is used to calculate the slope and/or define the sloping line 318 (e.g., define a linear function of the sloping line 318). The calculation of the function 408 is represented below as Equation 1:

$$\text{Throttle slope} = \frac{(CAS - V_{SS})}{(\text{Maximum of}(VcMin, V_{ss+10}) - V_{SS})} * \text{Throttle Angle Range} \quad (1)$$

In this example, the stick shaker velocity 306 ($V_{ss}$) is a function of aircraft flight conditions measured by one or more sensors of the aircraft. In particular, the stick shaker velocity 306 may be calculated based on altitude and/or attitude of the aircraft. In some examples, $V_{ss}$ may be a function of a lower speed limit such as the minimum control speed (e.g., 1.3 times the minimum control speed).

In this example, once the slope of the function 408 is calculated, a lag filter 409 is used to smooth and/or reduce noise of the output of the function 408. In some examples, a rate limiter 410 is used to limit rates of changes of the throttle angles. A range limit 412 then resolves the calculated slope from the calculation 408 to the angular range of the throttle, which ranges from 0 to 39 degrees in this example, to define a lower angular limit. In particular, the angular range of 0 to 39 degrees in this example is defined by an autothrottle aft limit of 31 degrees while an aft stop is 33 degrees and a climb thrust point is 68 degrees. In this example, the highest autothrottle point is 70 degrees and the corresponding physical stop is at 80 degrees. As a result, the highest throttle point at 70 degrees minus the autothrottle aft limit of 31 degrees yields the 39 degree range.

Next, a maximum throttle angle limit (e.g., a maximum aft limit value) 414 is provided along with the lower angular limit from the range limit 412 to a mathematical operation (e.g., an additive or a subtractive operation, etc.) 416 to determine a calculated/modified aft limit (e.g., a limit of the aft limit 212) 418 for performance enhancement of the aircraft and/or to maintain the aircraft in a preferred flight condition (e.g., maintain a velocity above the stick shaker velocity, $V_{ss}$, or a multiple of the stick shaker velocity). The mathematical operation 416 may be represented by Equation 2 below, for example:

Modified Throttle Aft Limit=Maximum Throttle Angle Limit−Range Limit (2)

While the example calculations and/or signal filtering are shown above in the examples described in connection with FIG. 4, any appropriate equations, values, operations and/or filtering may be used.

Figure 5:
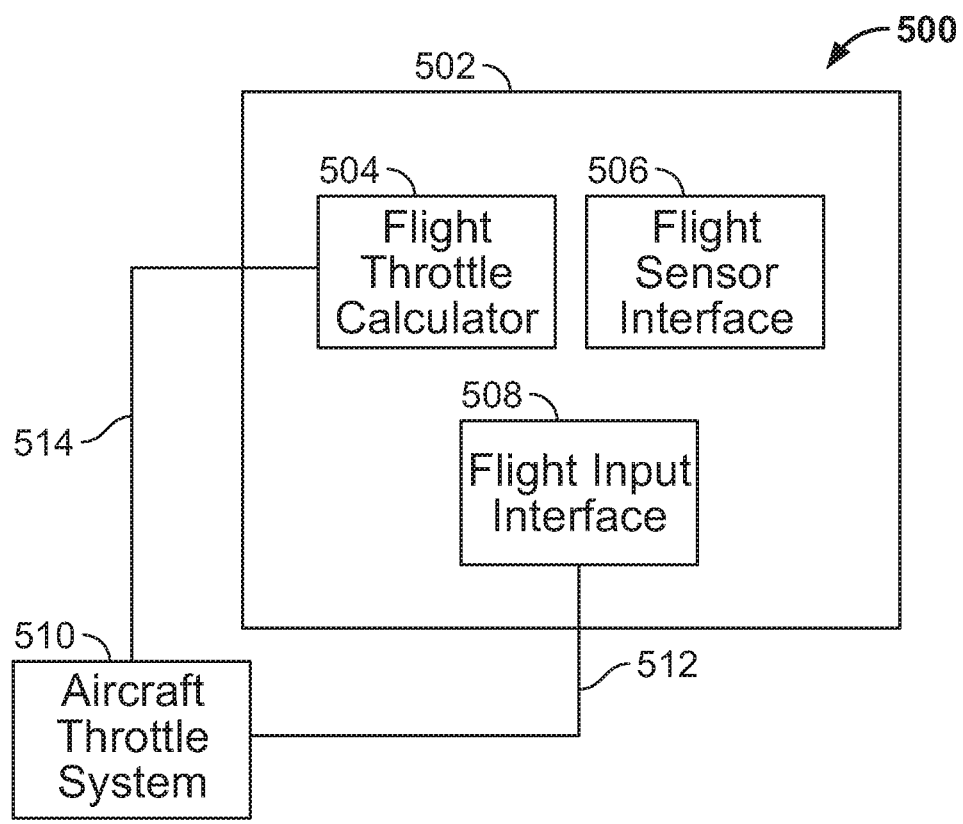
FIG. 5 is an example throttle control system that may be used to implement the examples disclosed herein.

FIG. 5 is an example throttle control system (e.g., an automated throttle control system) 500 that may be used to implement the examples disclosed herein. The example throttle control system 500 includes a flight throttle computation system 502, which includes a flight throttle calculator 504, a flight sensor interface 506 and a flight input interface 508. The control system 500 of the illustrated example also includes an aircraft throttle system 510, which is communicatively coupled to the flight input interface 508 via communication lines 512 and to the flight throttle calculator 504 via communication lines 514.

In operation, the example flight sensor interface 506 determines flight conditions of an aircraft, such as the aircraft 100. In particular, the flight sensor interface 506 may determine flight conditions such as a calibrated airspeed, altitude, wind speed, attitude, terrain topography, weather conditions, air temperature and/or flight orientation (e.g., yaw, pitch, roll, etc.), etc. based on sensor data and/or an analysis of the sensor data. In this example, the flight input interface 508 receives flight inputs, which may be manual controls (e.g., a manual control of the flight throttle) and/or flight mode commands (e.g., changing the aircraft to a FLCH and/or VNAV automated mode).

To determine/calculate the preferred and/or allowable throttle set points and/or ranges, the flight throttle calculator 504 of the illustrated example utilizes the calibrated airspeed along with the aforementioned flight conditions and/or a stick shaker speed ($V_{ss}$) to determine/calculate a preferred and/or allowable throttle range (e.g., the adjusted aft limit 212). For example, the flight throttle calculator 504 may use a defined region such as the region 312 of FIG. 3. Once the preferred and/or allowable throttle range(s) have been determined, the flight throttle calculator 504 of the illustrated example directs the aircraft throttle system 510 to maintain the throttle within the preferred and/or allowable throttle range(s). For example, the aircraft throttle calculator 504 may direct the throttle system 510 not to enable initiation of a hold mode if the throttle is moved out of the preferred and/or allowable throttle range(s) based on a received flight input. In particular, the flight throttle control system 502 and/or the flight throttle calculator 504 prevent the aircraft throttle system 510 from executing an input command to place the aircraft from an autothrottle mode into a hold/manual control mode based on the calculated preferred and/or allowable throttle range(s), for example. Additionally or alternatively, the flight throttle calculator 504 and/or the flight input interface 508 direct the aircraft throttle system 510 to maintain the throttle within the preferred and/or allowable throttle range(s) by varying an aft limit of the throttle, for example.

While an example manner of implementing the example throttle control system 500 of FIG. 5 is illustrated in FIG. 5, one or more of the elements, processes and/or devices illustrated in FIG. 5 may be combined, divided, re-arranged, omitted, eliminated and/or implemented in any other way. Further, the example flight throttle computation system 502, the example flight throttle calculator 504, the example flight sensor interface 506, the example flight input interface 508 and/or, more generally, the example throttle control system 500 of FIG. 5 may be implemented by hardware, software, firmware and/or any combination of hardware, software and/or firmware. Thus, for example, any of the example flight throttle computation system 502, the example flight throttle calculator 504, the example flight sensor interface 506, the example flight input interface 508 and/or, more generally, the example throttle control system 500 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, flight throttle computation system 502, the example flight throttle calculator 504, the example flight sensor interface 506, and/or the example flight input interface 508 is/are hereby expressly defined to include a tangible computer readable storage device or storage disk such as a memory, a digital versatile disk (DVD), a compact disk (CD), a Blu-ray disk, etc. storing the software and/or firmware. Further still, the example throttle control system 500 of FIG. 5 may include one or more elements, processes and/or devices in addition to, or instead of, those illustrated in FIG. 5, and/or may include more than one of any or all of the illustrated elements, processes and devices.

Figure 6:
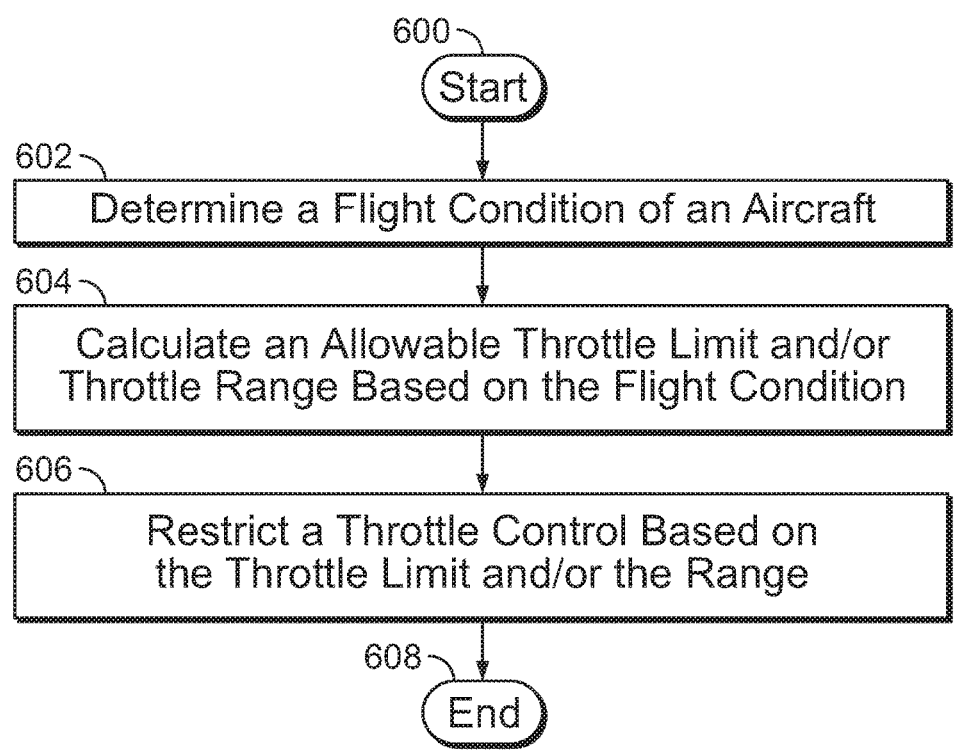
FIG. 6 is a flowchart representative of an example method that may be used to implement the example throttle control system of FIG. 5.
Figure 7:
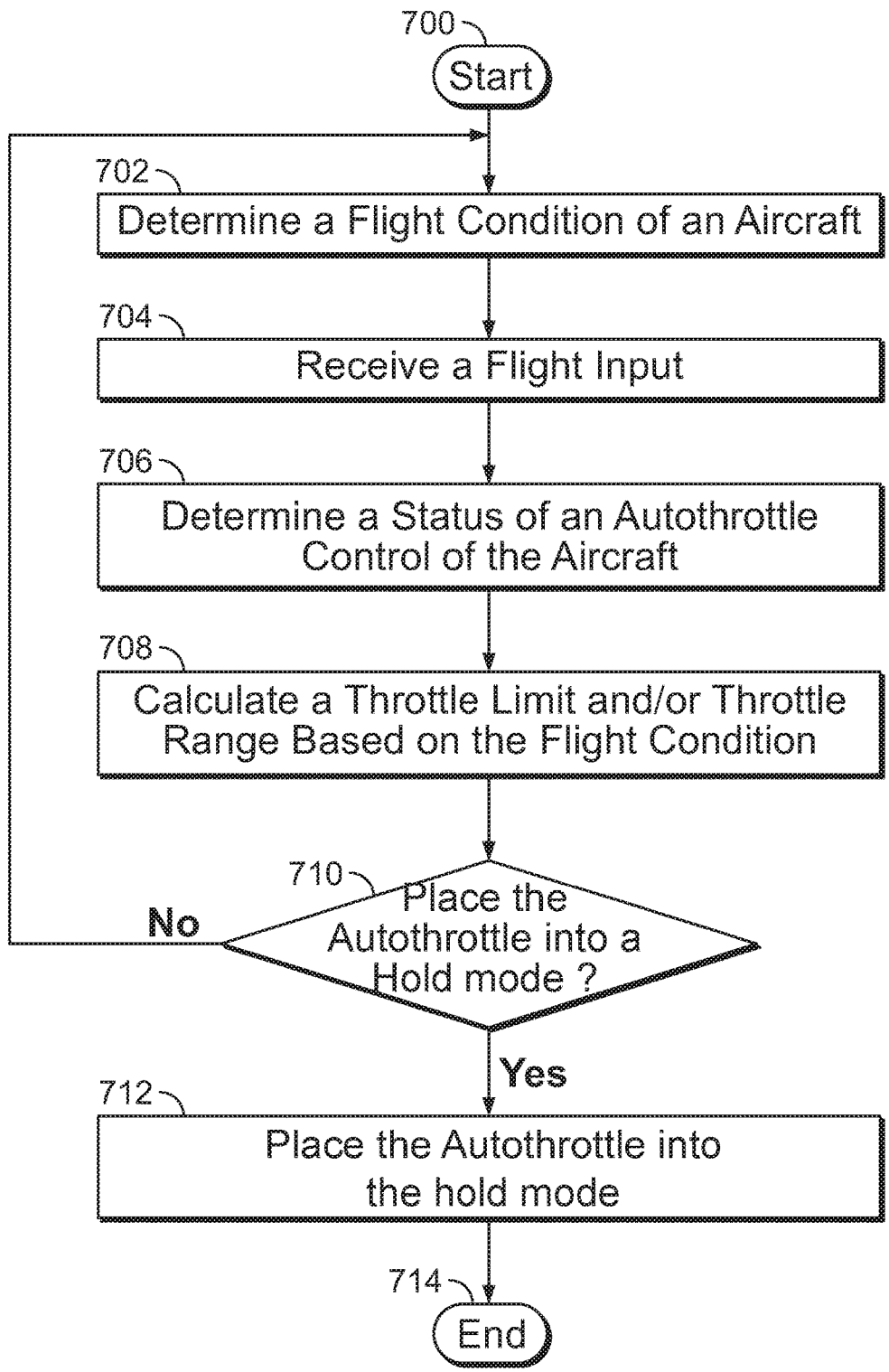
FIG. 7 is a flowchart representative of another example method that may be used to implement the example throttle control system of FIG. 5.
Figure 8:
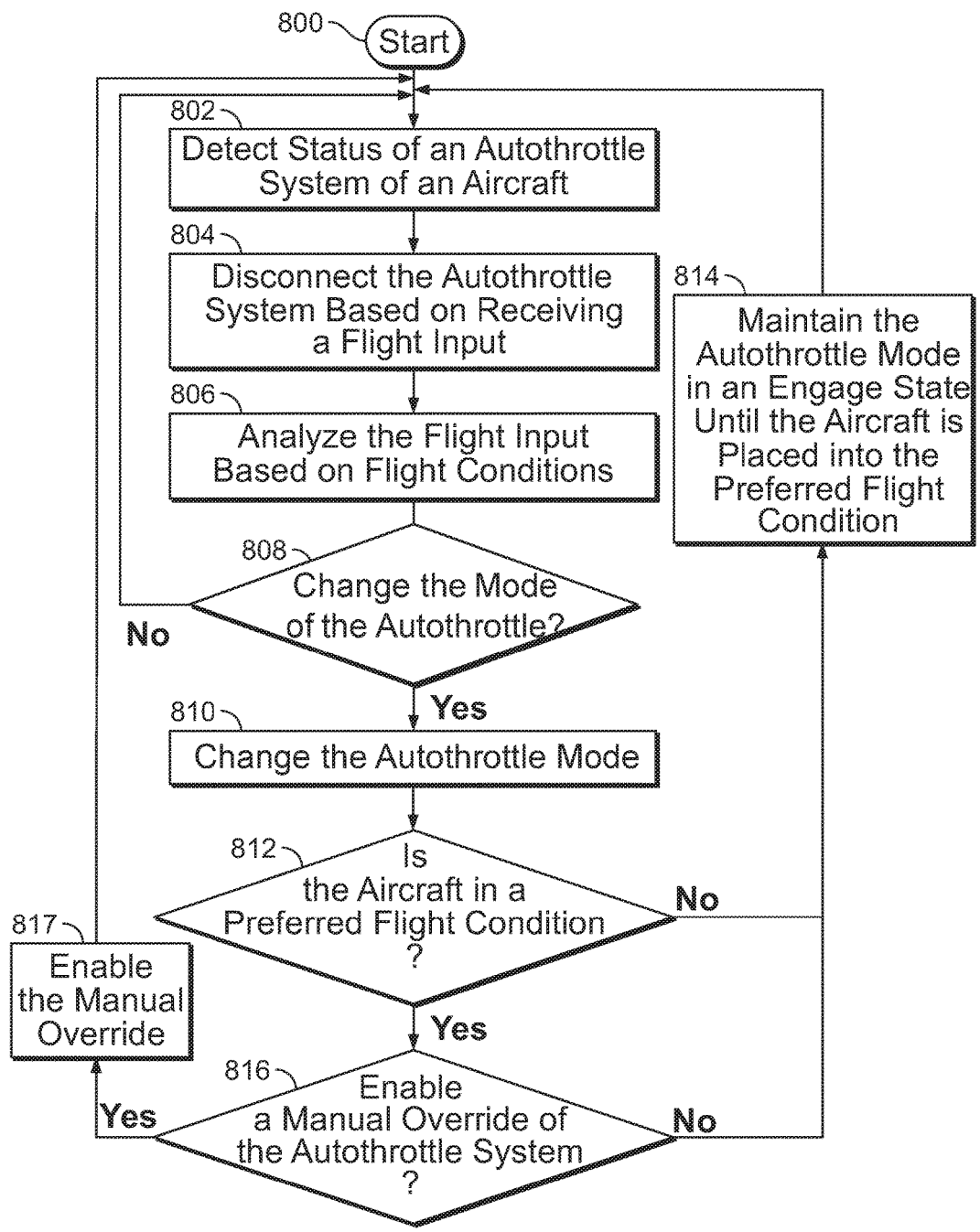
FIG. 8 is a flowchart representative of another example method that may be used to implement the example throttle control system of FIG. 5.

Flowcharts representative of example methods for implementing the throttle control system 500 of FIG. 5 are shown in FIGS. 6-8. In these examples, the method may be implemented by machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 6-8, many other methods of implementing the example throttle control system 500 may alternatively be used. For example, the order of execution of the blocks may be changed, and/or some of the blocks described may be changed, eliminated, or combined.

As mentioned above, the example methods of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 6 begins at block 600 where an aircraft such as the aircraft 100 is in an automated flight level change mode (FLCH) in which the aircraft is changing altitude (e.g., an automated descent) (block 600). In this example, the autopilot is disengaged, but a flight director is on and provides guidance commands to a pilot of the aircraft. However, in regards to the example method of FIG. 6, the aircraft of the illustrated example may or may not be in an automated flight mode.

A flight condition of the aircraft is determined (block 602). In particular, sensors communicatively coupled to a sensor interface such as the flight sensor interface 506 provide information related to the aircraft including aircraft speed (e.g., calibrated aircraft speed), attitude, altitude, orientation, and/or air conditions. In some examples, variables such as stick shaker speed ($V_{ss}$) and/or minimum speeds ($V_{cmin}$), which may be used in calculations related to preferred and/or allowed throttle limits, are determined based on this information.

Next, an allowable throttle limit (e.g., the aft limit 212) and/or throttle range is calculated based on the flight condition (block 604). For example, an algorithm such as the algorithm 400 of FIG. 4 may be used to calculate the throttle limit and/or allowable throttle range. Additionally or alternatively, a boundary such as the region 312 of FIG. 3 may be used in this calculation.

In this example, a throttle control (e.g., an automated throttle control) is restricted based on the calculated throttle limit and/or range (block 606). In some examples, the throttle control (e.g., the throttle lever 208) is physically limited and/or varied via an electromechanical system (e.g., an electromechanical restriction system) based on the calculated throttle limit and/or throttle range. In some examples, the physical range of the throttle control is not varied, but the throttle limits at an aft limit (e.g., the aft limit 212) and/or a fore limit (e.g., the fore limit 214) are varied based on the calculated allowable throttle limit and/or range. As a result, the throttle is, thus, prevented from placing the aircraft into a non-preferred state and/or low performance condition regardless of the physical position of the throttle.

In this example, the process ends after the throttle control has been restricted (block 608). However, in some examples, the process repeats continuously during flight. Additionally or alternatively, the process is initiated and continues based on the aircraft being in a defined mode (e.g., an autothrottle enable mode).

Turning to FIG. 7, the example method of FIG. 7 begins at block 700 where an aircraft such as the aircraft 100 of FIG. 1 is in an autopilot mode during cruise (block 700). In this example, an autothrottle system of the aircraft is engaged. In contrast to the example of FIG. 6, instead of limiting a throttle limit and/or throttle range based on flight conditions and/or sensor data, a flight input is compared and/or analyzed to determine whether the it is permissible for the flight input to override the autothrottle system and/or place the autothrottle control into a hold mode.

In this example, a flight condition of the aircraft is determined (block 702). In particular, sensor data from sensors communicatively coupled to a flight sensor interface such as the flight sensor interface 506 is used to determine the flight condition.

Next, a flight input is received (block 704). In particular, an input command from cockpit controls of the aircraft is received by a flight interface such as the flight interface 508. For example, the input may be a flight level change (FLCH) (e.g., a controlled descent) to a defined altitude. In some examples, the flight input may be a manual input such as a manual throttle change (e.g., a throttle decrease, etc.).

In some examples, a status of an autothrottle control of the aircraft is determined (block 706). In such examples, a flight input interface such as the flight input interface 508 may be queried to determine whether the autothrottle control is engaged. However, in this example, the autothrottle control of the aircraft is engaged and, thus, the status of the autothrottle control is known.

A throttle limit (e.g., the aft thrust limit 212) and/or throttle range (e.g., allowable throttle limit and/or range, thrust resolver angle, etc.) is calculated based on the flight condition (block 708). In this example, a flight throttle calculator such as the flight throttle calculator 504 is used to determine the throttle limit and/or the throttle range based on the flight conditions (e.g., calibrated air speed, altitude, flight mode, air conditions, wind conditions, etc.). To calculate the allowable throttle angle and/or throttle range that will maintain the aircraft in a preferred flight condition (e.g., a preferred flight state, a preferred flight mode, etc.), the flight throttle calculator of the illustrated example utilizes an algorithm such as the algorithm 400 of FIG. 4. Additionally or alternatively, the flight input may be also used in this calculation.

Next, it is determined whether to place the autothrottle into a hold mode (block 710). In this example, the flight input is compared to the calculated allowable throttle limit and/or throttle range. In particular, if the flight input (e.g., a manual throttle change, initiation of an automated autopilot mode and/or program, etc.) will place the aircraft outside of the preferred mode (e.g., below a $V_{ss}$ speed such as the $V_{ss}$ speed 306), the autothrottle will not be allowed to be placed into the hold mode. For example, a comparison and/or analysis illustrated by the throttle control plot 300 of FIG. 3 may be used to determine whether to allow a change in the autothrottle status (e.g., to disconnect, disengage, hold, activate, or change the mode of the autothrottle.).

If the autothrottle is not to be placed into the hold mode (block 710), control of the process returns to block 702. However, if the autothrottle is to be placed into the hold mode (block 710), the process proceeds to block 712 where the autothrottle is placed into the hold mode (block 712) and the process ends (block 714).

Turning to FIG. 8, the example method of FIG. 8 begins at block 800 where an aircraft in flight is proceeding/trending (e.g., via interpolation) to a non-preferred and/or lower performance flight condition (e.g., a maneuver and/or altitude change) (block 800). In this example, the autothrottle mode is to be automatically changed as the aircraft proceeds or has proceeded into the non-preferred and/or lower performance regime.

In some examples, a status of the autothrottle system of the aircraft is detected (block 802). For example, a flight input interface such as the flight input interface 508 may be used to communicate with cockpit control of the aircraft to determine whether the autothrottle system is engaged, for example.

In some examples, the autothrottle is placed into the hold mode and/or disengaged based on receiving a flight input (e.g., a manual control, initiation of an automated flight program, etc.) (block 804).

In this example, the flight input is analyzed based on the flight conditions (block 806). For example, the flight input is compared to a calculated flight throttle limit using the example algorithm 400 of FIG. 4. Additionally or alternatively, the flight input is compared to defined velocity/thrust boundary (e.g., the region 312) pertaining to a defined preferred flight condition. This comparison may be used to determine whether the flight input places the aircraft throttle out of the defined thrust/velocity boundaries or region(s).

Next, it is determined whether to change the mode of the autothrottle (block 808). In this example, the autothrottle mode is automatically changed based on whether the received flight input places the aircraft throttle below a calculated throttle limit. Additionally or alternatively, the autothrottle mode is to be automatically changed based on determining that the aircraft is trending towards a non-preferred condition (e.g., a rapid climb and/or speed decrease, trends away from a preferred flight state) although the aircraft is not yet in the non-preferred condition. If the autothrottle mode is not to be changed (block 808), control of the process returns to block 802.

However, if the autothrottle mode is to be changed (block 808), control of the process proceeds to block 810, where the autothrottle mode is changed (block 810). In some examples, the autothrottle mode is changed (e.g., automatically changed) by overriding a hold mode of the autothrottle system.

After the autothrottle mode is changed (block 810), it is then determined whether the aircraft is in a preferred flight condition (block 812). For example, a sensor interface such as the flight sensor interface 506 is used to determine whether the aircraft is within the preferred flight condition (e.g., within the boundaries of the flight control plot 300 and/or use of the algorithm 400 indicates that the aircraft is utilizing a throttle level above a calculated allowable throttle limit/thrust resolver angle). Alternatively, in some examples, the aircraft is determined to be in the preferred flight condition if the velocity of the aircraft exceeds the stick shaker velocity, $V_{ss}$ (e.g., exceeds a multiple of greater than 1.1-1.5 times the stick shaker velocity).

If the aircraft is not in the preferred flight condition (block 812), control of the process proceeds to block 814, where the autothrottle mode is maintained until the aircraft is placed into the preferred flight condition (block 814). In some examples, the autothrottle is prevented from entering the hold mode until the aircraft has reached the preferred flight condition (e.g., a preferred velocity of the aircraft given an altitude and/or orientation of the aircraft). After the aircraft has reached the preferred flight condition, control of the process returns to the block 802.

In some examples, if the aircraft is in the preferred flight condition (block 812), control of the process proceeds to block 816, where it is determined whether to enable a manual override of the autothrottle system (block 816). In particular, the autothrottle system of the illustrated example is placed into a mode where a manual override of the autothrottle system is enabled as long as the aircraft is not trending away from the preferred flight condition. In other words, a hold mode of the autothrottle system is enabled based on the aircraft not trending away from the preferred flight condition. In this example, if the manual override is to be enabled, the manual override is enabled (block 817) and control of the process proceeds to block 802.

Alternatively, if the aircraft is trending away from the preferred flight condition while still within the preferred flight condition, the manual override of the autothrottle system is not enabled (block 816) and control of the process proceeds to block 814.

Figure 9:
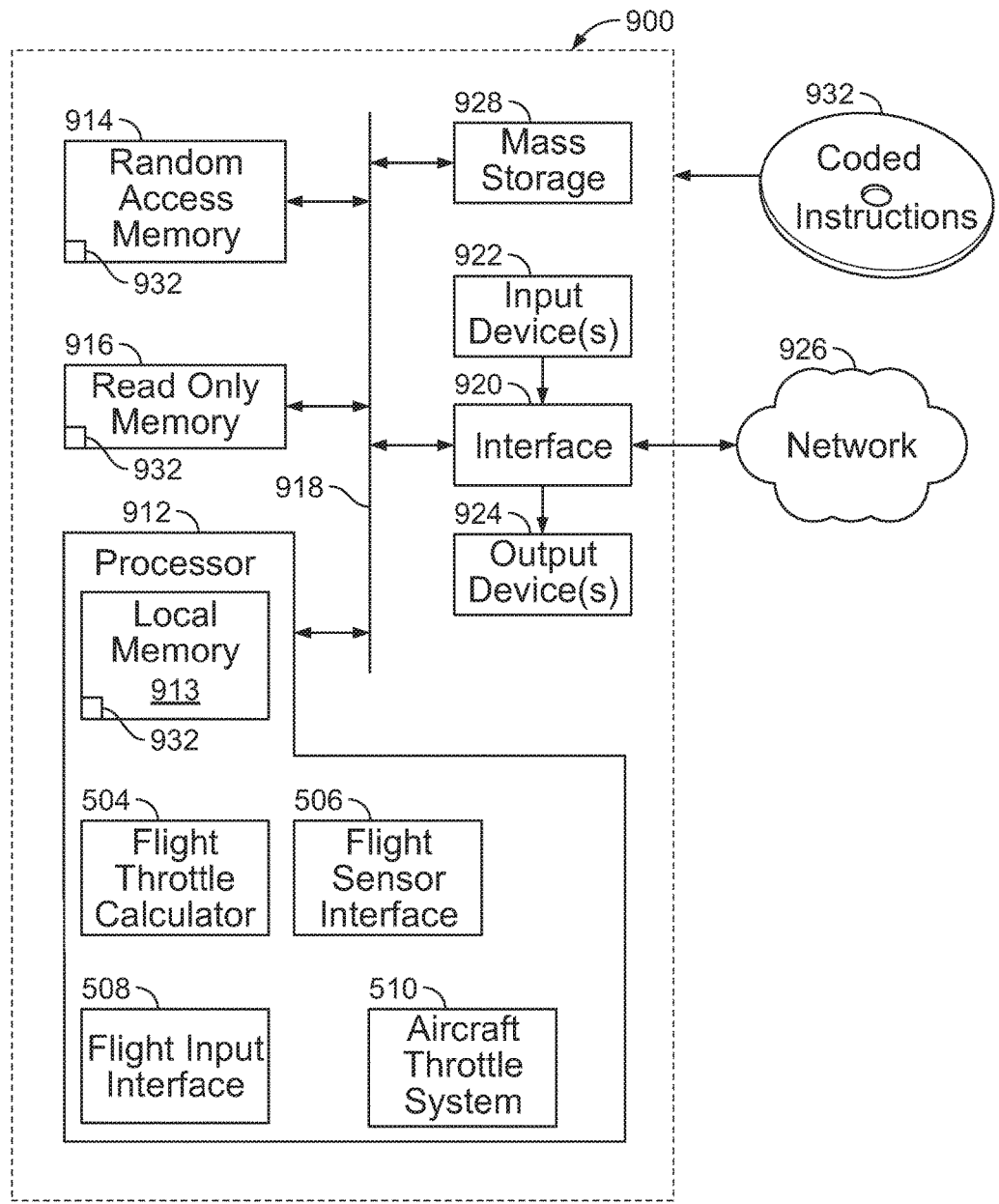
FIG. 9 is a block diagram of an example processor platform capable of executing machine readable instructions to implement the example methods of FIGS. 6-8.

FIG. 9 is a block diagram of an example processor platform 900 capable of executing the example methods of FIGS. 6-8 to implement the example throttle control system 500 of FIG. 5. The processor platform 900 can be, for example, a server, a personal computer, a mobile device (e.g., a cell phone, a smart phone, a tablet such as an iPad™), a personal digital assistant (PDA), an Internet appliance, a digital video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). In this example, the processor 912 also includes the flight throttle calculator 504, the flight sensor interface 506, the flight input interface 508 and the aircraft throttle system 510. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 of FIGS. 6-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture enable automated control of throttle systems to automatically maintain an aircraft in a preferred state and/or enhance performance of the aircraft. The examples disclosed herein allow automated throttle range control and/or systems to prevent a throttle from moving past a calculated preferred throttle range. The examples disclosed herein also allow a system to prevent an autothrottle system from entering a hold/override mode based on flight conditions and/or a flight input. The examples disclosed herein allow automated throttle systems to be automatically change modes to prevent the aircraft from moving into a non-preferred state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are related to aircraft, the examples disclosed may be applied to any vehicles, space craft, submersibles, etc.

What is claimed is:

1. A method comprising:
calculating, using a processor, a thrust resolver angle based on a flight condition of an aircraft; and
controlling a throttle from moving past at least one of the thrust resolver angle or a range defined by the thrust resolver angle to maintain the aircraft in a preferred flight mode, wherein controlling the throttle includes preventing an autothrottle system from being put into a hold mode that overrides the autothrottle system when the aircraft trends away from the preferred flight mode.

2. The method as defined in claim 1, wherein calculating the thrust resolver angle is further based on a selected automated mode of the aircraft.

3. The method as defined in claim 1, wherein the flight condition includes at least one of velocity, pitch, yaw, roll, or altitude of the aircraft.

4. The method as defined in claim 1, wherein calculating the thrust resolver angle is based on a region defined by velocity and thrust ranges.

5. The method as defined in claim 1, wherein controlling the throttle includes restricting a range of movement of a throttle lever.

6. The method as defined in claim 5, wherein restricting the throttle includes electromechanical restriction of the throttle lever.

7. The method as defined in claim 1, wherein the preferred flight mode includes maintaining the aircraft at a speed exceeding a stick shaker velocity of the aircraft.

8. A method for controlling an autothrottle control of an aircraft comprising:
analyzing, using a processor, a received flight input and at least one flight condition to determine whether the flight input will place the aircraft in a state different from a preferred flight state;
upon determining that the flight input will not place the aircraft in the state different from the preferred flight state, enabling the autothrottle control to be placed into a hold mode that overrides the autothrottle control; and
automatically preventing the autothrottle control from entering the hold mode when the aircraft trends away from the preferred flight state.

9. The method as defined in claim 8, further including upon determining that the flight input will place the aircraft in the state different from the preferred flight state, automatically changing a mode of the autothrottle control.

10. The method as defined in claim 8, further including controlling a throttle level above a thrust resolver angle, wherein the thrust resolver angle is based on a region defined by velocity and thrust ranges.

11. The method as defined in claim 8, wherein the preferred flight state includes a velocity greater than a stick shaker velocity of the aircraft.

12. A tangible machine readable medium having instructions stored thereon, which when executed, cause a processor to:
determine that a flight input of an aircraft will cause the aircraft to be in a non-preferred flight condition; and
based on the determination, prevent an autothrottle mode of the aircraft from entering a hold mode that overrides the autothrottle mode to maintain the aircraft in a preferred flight condition.

13. The machine readable medium having instructions stored thereon as defined in claim 12, which when executed, further cause the processor to calculate at least one of an allowable throttle limit or throttle range.

14. The machine readable medium having instructions stored thereon as defined in claim 13, which when executed, further cause the processor to direct an electromechanical system to inhibit motion of a throttle lever beyond the at least one of the allowable throttle limit or throttle range.

15. The machine readable medium having instructions stored thereon as defined in claim 12, wherein the flight input includes a command to perform an automated flight program.

16. The machine readable medium having instructions stored thereon as defined in claim 12, wherein the flight input includes a manual input.

17. The machine readable medium having instructions stored thereon as defined in claim 12, wherein the processor determines that the aircraft is trending away from the preferred flight condition to determine that the flight input will cause the aircraft to be in the non-preferred flight condition.

18. An apparatus comprising:
a sensor of an aircraft to determine a flight condition of the aircraft;
a processor to calculate at least one of a throttle limit or a throttle range based on the flight condition and a flight input to maintain the aircraft in a preferred flight condition, wherein the processor is to prevent an automated throttle control system of the aircraft from entering a hold mode that overrides the automated throttle control system based on the flight input trending the aircraft away from the preferred flight condition; and
an electromechanical mechanism to control a throttle lever from moving beyond the at least one of the throttle limit or the throttle range.

19. The apparatus as defined in claim 18, wherein the processor is to calculate the at least one of the throttle limit or the throttle range by comparing an airspeed of the aircraft to a region defined by velocity and thrust ranges.

20. The apparatus as defined in claim 18, wherein the processor is to calculate the at least one of the throttle limit or the throttle range further based on the flight input.

* * * * *